Patented Jan. 3, 1950

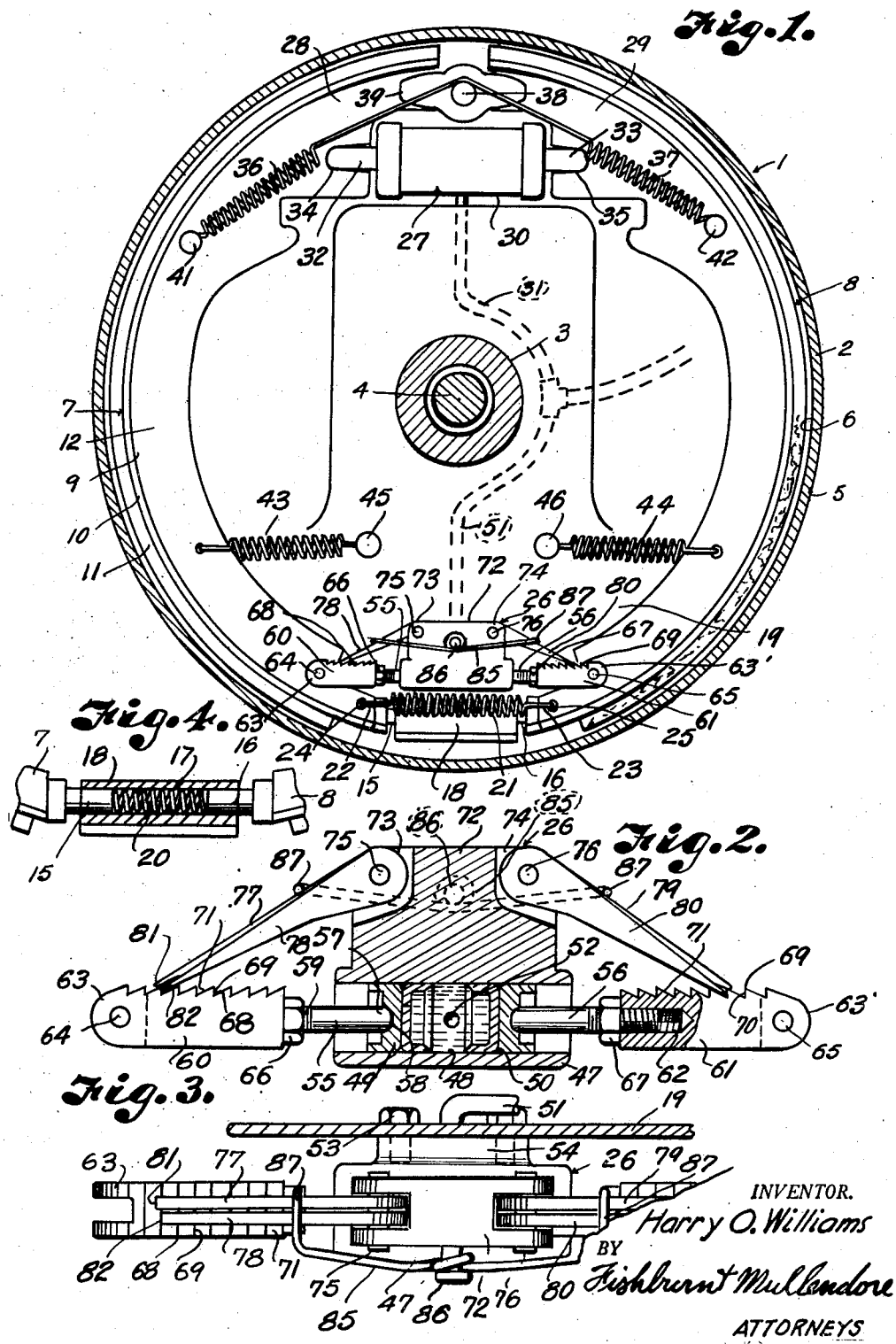

2,493,177

UNITED STATES PATENT OFFICE 2,493,177

AUTOMATICALLY ADJUSTABLE BRAKE

Harry O. Williams, Lawson, Mo., assignor of one-half to T. B. Watkins

Application October 1, 1945, Serial No. 619,510

4 Claims. (Cl. 188—79.5)

This invention relates to an automatically adjustable brake of the type illustrated and described in Patent No. 2,322,492 issued to me on June 22, 1943, and which includes a pressure fluid operated brake mechanism equipped with means for maintaining a predetermined working clearance of the braking elements with respect to the rotary member to be retarded, the present invention being an improvement over that illustrated in the patent.

The principal object of the present invention is to provide an automatic adjusting mechanism wherewith the braking elements are maintained concentrically of the rotary member, thereby rendering substantially the entire braking surface of the brake elements effective on the rotary member and produce a more efficient braking action when the braking elements are operated.

Other objects of the invention are to provide an automatic adjusting mechanism that is adapted for ready replacement of manually operable brake adjusting mechanisms; and to provide a structure which more effectively prevents chattering and irregular brake action when the brake is applied.

In accomplishing these and other objects of the invention hereinafter pointed out, I have provided improved structure, the preferred form of which is illustrated in the accompanying drawing, wherein:

Fig. 1 is a section through a pressure fluid actuated brake equipped with an automatic adjusting mechanism embodying the features of the present invention.

Fig. 2 is an enlarged section of the adjusting mechanism, parts being shown in elevation.

Fig. 3 is a plan view of the adjusting mechanism shown in Fig. 2.

Fig. 4 is a detail view partly in section showing resilient support of the brake elements.

Referring more in detail to the drawings:

1 designates a brake mechanism including a rotary member such as a brake drum 2 that is attached to a member to be retarded, for example, the wheel of a motor vehicle indicated by the axle housing 3 which carries an axle 4 as in conventional practice. The drum 2 has an annular flange 5 provided with an inner annular braking surface 6 to be engaged by braking elements 7 and 8. The braking elements illustrated are in the form of substantially arcuate-shaped brake shoes 9, each including a flange 10 mounting a brake lining 11 and backed by a web 12. The brake shoes have substantially floating support within the brake drum but are maintained substantially concentric therewith as now to be described.

Fixed to and projecting from the adjacent ends 13 and 14 of the shoes are pins 15 and 16 respectively which are slidably mounted in a bore 17 of a block 18 that is integral with or which is fixed to the flange 19 of the axle housing in any suitable manner. The pins 15 and 16 are forced apart to urge the brake shoes in the direction of the braking surface of the drum by a coil spring 20 located in the bore 17 and having the ends thereof bearing upon the pins as best shown in Fig. 4.

In order to yieldingly retain the connected ends of the brake shoes out of contact with the drum to permit free rotation thereof when the brakes are not applied, the ends of the brake shoes are interconnected by a coil spring 21 having hooked ends 22 and 23 engaged in openings 24 and 25 in the ends of the respective shoes as shown in Fig. 1. The spring 21 preponderates over the spring 20 but is yieldable under action of the automatic brake adjusting means generally designated 26 later described. As above described, the shoes are normally supported out of contact with the flange 5 of the drum 2.

The brake shoes are moved into braking contact with the drum by means of a pressure actuated mechanism 27 interposed between the opposite ends 28 and 29 of the shoes. The pressure actuated mechanism includes a cylinder 30 having fixed support on the flange 19 and contains the conventional pistons forced apart by introduction of pressure fluid therebetween, which pressure fluid is admitted through the pipe 31 responsive to a master cylinder as in conventional practice. Power is applied from the pistons to the shoes through piston rods 32 and 33 engaged in recesses 34 and 35 formed within the web portions of the brake shoes as shown in Fig. 1. The brake shoes are normally retained in retracted position by coil springs 36 and 37 which have the interconnecting portion extending over a shaft 38 of a mechanical brake actuator 39, which actuator is ordinarily operated by the emergency brake lever (not shown) of the vehicle.

The opposite ends of the spring are connected with studs 41 and 42 projecting from the web portions of the shoes. Cooperating with the springs 21, 36 and 37 are intermediate springs 43 and 44 having outer ends fixed to the webs of the shoes and inner ends fixed to studs 45 and 46 projecting from the flange of the axle housing or brake cover as the case may be. When pressure is relieved in the pipe 31, the springs withdraw the shoes from braking contact with the drum and restore the original position of the pistons after a braking operation. The springs are yieldable responsive to the fluid pressure applied between the pistons in the cylinder 22 when a braking force is to be applied.

After the brake has been in use, the clearance between the brake shoes and the braking surface of the drum increases by wear and the automatic adjusting means comes into play to maintain a substantially constant clearance between the braking surface of the shoes and the braking surface of the drum when the shoes are retracted.

In accordance with the present invention, the adjusting means is located in opposite diametric relation with the main cylinder so that it is effective in spacing the corresponding ends of the shoes and holds them in position to maintain a positive working clearance until such a time that the clearance increases in an amount where the adjusting mechanism is effective in repositioning the shoes.

The adjusting mechanism includes a cylinder member 47 having a bore 48 containing opposed pistons 49 and 50 similar to the pistons of the main cylinder and which are forced apart by the pressure fluid in the line 31 through a branch line 51 that is connected with a port 52 located intermediate the pistons as shown in Fig. 2. The cylinder is rigidly mounted to a fixed part, for example, the flange 19 which closes the open side of the brake drum, the cylinder member being connected by fastening devices such as cap screws 53 extending through openings in the flange and into threaded sockets of a boss 54 projecting from a side of the cylinder member as best shown in Fig. 3. The ends of the cylinder bore are open to accommodate rods 55 and 56, the inner ends of which are rounded as at 57, and seat in axial sockets 58 of the pistons. The outer ends of the rods are provided with threads 59 for mounting similar toothed heads 60 and 61, the heads having internally threaded sockets 62 to receive the threaded ends of the rods. The outer ends of the heads have ears 63 and 63' engaging the brake shoe webs and which are pivotally connected therewith by cross pins 64 and 65 whereby the ends 13 and 14 of the shoes are interconnected, to be moved outwardly into contact with the brake drum simultaneously with actuation of the main cylinder. Thus, when the brakes are applied, the pressure of the shoes act uniformly throughout the length thereof and it is obvious that any wear occurring between the braking surfaces is uniform so that the breaking surfaces of the shoes and drum are kept circular and in concentric relation; however, it is necessary to provide a working clearance between the braking surfaces and this is effected by initially adjusting the heads 60 and 61 on the threaded ends of the rods 55 and 56 after which the adjustment is maintained by jamb nuts 66 and 67 threaded on the rods and engaging against the ends of the heads as shown in Fig. 2.

In order to automatically maintain this spacing without further resort to adjustment of the heads on the piston rods, the heads are provided with a series of transverse teeth 68 and 69 having pawl engaging shoulders 70 and pawl slide faces 71 intermediate the shoulders 70. Extending laterally from the cylinder member is a bracket 72 extending in the longitudinal direction of the bore and provided with spaced ears 73 and 74 at the respective ends thereof to support transverse pins 75 and 76. Pivotally mounted on the pins 75 and 76 are pairs of pawls 77—78 and 79—80 respectively. The pawls have relatively sharp ends 81 and 82 adapted to engage the teeth of the heads. The pawls of each pair are of differential length, that is, one of the pawls of each pair is substantially one-half a tooth shorter than the other so that the teeth may be relatively large and yet accomplish a fine adjustment of the brake shoes. For example, it is only necessary to move the pistons a distance corresponding to one-half the spacing of the teeth for one of the pawls to become effective in limiting retraction of the shoes responsive to action of the springs 21, 43 and 44.

The pawls are normally retained in engagement with the teeth of the heads by a wire-like spring 85 coiled about a pin 86 projecting laterally from the bracket 72 and having ends 87 extending over the upper edges of the pawls as best shown in Fig. 3. In the illustrated instance the points 81 of the pawls are relatively sharp and are arranged at a substantial angle relatively to the shoulders of the teeth so that when the holding tooth is in position to engage the tip of a tooth at the time the brakes are engaged, the pawl comes to rest on the slide face of the next tooth. There is sufficient clearance between the end of the pawl and the root of the tooth to allow the brake shoe to retract sufficiently to clear the face of the drum. Thus, there is no chance of the pawls wedging against the shoulder faces of the teeth and holding the shoes locked against the brake drum. This result might also be attained by undercutting the pawl engaging faces of the teeth to provide the necessary pawl clearance of the root of the teeth.

The action of a brake constructed and assembled as described is as follows:

Assuming that the brake is to be applied, the master cylinder (not shown) is actuated to build up pressure in the pipe lines 31 and 51 which supply the main cylinder 30 and the cylinder 47 so that the pressure medium acts against the pistons in the respective cylinders to move the shoes outwardly in opposition to the springs. As the shoes move outwardly the heads having the teeth move outwardly under the pawls so that the shoulder then engaged with one of the pawls moves away from the end of that pawl. Upon release of the pressure medium the springs are effective in restoring the shoes to their original position; however, if sufficient wear has occurred so that when the toothed heads are moved outwardly a sufficient distance to permit dropping of one of the pawls of the respective pairs back of the shoulder of the next tooth, the heads cannot move back to their original position; consequently, the shoes are supported with the desired clearance being maintained between the brake band face and inner face of the brake drum, which space is approximately one-half a tooth space.

From the foregoing it is obvious that I have provided a brake mechanism with which the brake shoes are automatically maintained in concentric relation and with the desired clearance. Thus, the entire area of the brake shoes are effective throughout the life of the braking surfaces, which assures a positive, uniform braking action.

What I claim and desire to secure by Letters Patent is:

1. A brake mechanism including a rotatable member having a braking surface, a pair of brake shoes having braking surfaces, means for supporting the shoes at one of their adjacent ends to normally support the shoes out of contact with the rotatable member but in position to engage the braking surfaces of the rotatable member, actuating means connecting the brake shoes near their opposite ends, pressure fluid actuated means including a cylinder, pistons slidable in the cylinder, means connecting the pistons with the brake shoes and having teeth, pawls having pivotal support relative to said cylinder for engaging said teeth to limit retractive movement of the pistons, and means for supplying a pressure fluid to said cylinder to act between the pistons to effect movement of the brake shoes for bringing the braking surfaces of the shoes into contact with the braking surface of the rotatable member, said teeth being of a length relatively to the pawls to allow clearance of the shoes from the rotatable member when pressure fluid is discharged from said cylinder.

2. A brake mechanism including a rotatable member having a braking surface, a pair of brake shoes having braking surfaces, means for supporting the shoes at one of their adjacent ends to normally support the shoes out of contact with the rotatable member but in position to engage the braking surfaces of the rotatable member, actuating means connecting the brake shoes near their opposite ends, pressure fluid actuated means including a cylinder, pistons slidable in the cylinder, means connecting the pistons with the brake shoes and having teeth, pawls having pivotal support relative to said cylinder for engaging said teeth to limit retractive movement of the pistons, means for supplying a pressure fluid to said cylinder to act between the pistons to effect movement of the brake shoes for bringing the braking surfaces of the shoes into contact with the braking surface of the rotatable member, said teeth being of a length relatively to the pawls to allow clearance of the shoes from the rotatable member when pressure fluid is discharged from said cylinder, and springs cooperating with the supporting means for normally retaining the shoes in retracted position.

3. A brake mechanism including a rotatable member having a braking surface, a pair of brake shoes having braking surfaces, means for supporting the shoes at one of their adjacent ends to normally support the shoes out of contact with the rotatable member but in position to engage the braking surfaces of the rotatable member, actuating means connecting the brake shoes near their opposite ends, pressure fluid actuated means including a cylinder, pistons slidable in the cylinder, means connecting the respective pistons with the brake shoes and having teeth, pairs of pawls having pivotal support relative to said cylinder for engaging the teeth of each connecting means to limit retractive movement of the pistons, and means for supplying a pressure fluid to said cylinder to act between the pistons for bringing the braking surfaces of the shoes into contact with the braking surface of the rotatable member, said pawls of a pair having a tooth engaging end spaced from a tooth engaging end of the other pawl a distance less than the spacing of said teeth and said end of the pawls being positioned relatively to the teeth to allow clearance of the shoes from the rotatable member when pressure fluid is discharged from the cylinder.

4. A brake mechanism including a rotatable member having a braking surface, a pair of brake shoes having braking surfaces, means for supporting the shoes at one of their adjacent ends to normally support the shoes out of contact with the rotatable member but in position to engage the braking surfaces of the rotatable member, actuating means connecting the brake shoes near their opposite ends, pressure fluid actuated means including a cylinder, pistons slidable in the cylinder, means connecting the respective pistons with the brake shoes and having teeth, pairs of pawls having pivotal support relative to said cylinder for engaging the teeth of each connecting means to limit retractive movement of the pistons, means for supplying a pressure fluid to said cylinder to act between the pistons to effect movement of the brake shoes for bringing the braking surfaces of the shoes into contact with the braking surface of the rotatable member, said pawls of a pair having a tooth engaging end spaced from a tooth engaging end of the other pawl a distance less than the spacing of said teeth and said end of the pawls being positioned relatively to the teeth to allow clearance of the shoes from the rotatable member when pressure fluid is discharged from the cylinder, and springs cooperating with the supporting means for normally retaining the shoes in retracted position.

HARRY O. WILLIAMS.

REFERENCES CITED

The following references are of record in the file of this patent:

UNITED STATES PATENTS

| Number | Name | Date |
| --- | --- | --- |
| Re. 21,380 | La Brie | Mar. 5, 1940 |
| 2,158,699 | Hoyt | May 16, 1939 |
| 2,158,700 | Hoyt | May 16, 1939 |
| 2,175,446 | Rasmussen | Oct. 10, 1939 |
| 2,322,492 | Williams | June 22, 1943 |
| 2,345,108 | Goepfrich | Mar. 28, 1944 |
| 2,372,415 | Eksergian | Mar. 27, 1945 |